US008668572B2

(12) United States Patent
Walker et al.

(10) Patent No.: US 8,668,572 B2
(45) Date of Patent: Mar. 11, 2014

(54) SYSTEMS AND METHODS FOR EXECUTING GAMES EMPLOYING BONUS AMOUNTS BASED ON BONUS CHARACTERISTICS

(75) Inventors: Jay S. Walker, Ridgefield, CT (US); James A. Jorasch, Stamford, CT (US); Stephen C. Tulley, Fairfield, CT (US)

(73) Assignee: IGT, Las Vegas, NV (US)

( * ) Notice: Subject to any disclaimer, the term of this patent is extended or adjusted under 35 U.S.C. 154(b) by 800 days.

(21) Appl. No.: 11/428,425

(22) Filed: Jul. 3, 2006

(65) Prior Publication Data

US 2006/0252506 A1 Nov. 9, 2006

Related U.S. Application Data

(63) Continuation of application No. 10/793,135, filed on Mar. 3, 2004, now abandoned.

(60) Provisional application No. 60/452,079, filed on Mar. 4, 2003.

(51) Int. Cl.
*A63F 13/00* (2006.01)

(52) U.S. Cl.
USPC .................. 463/20; 463/16; 463/17; 463/18; 463/19; 463/30; 463/31; 463/32; 273/148 R; 273/138.1

(58) Field of Classification Search
USPC ................ 463/16–20, 30–32, 42; 273/148 R, 273/138.1
See application file for complete search history.

(56) References Cited

U.S. PATENT DOCUMENTS

| | | | | |
|---|---|---|---|---|
| 5,280,909 | A | 1/1994 | Tracy | 273/138 A |
| 6,033,307 | A * | 3/2000 | Vancura | 463/20 |
| 6,053,813 | A | 4/2000 | Mathis | 463/26 |
| 6,068,552 | A | 5/2000 | Walker | |
| 6,135,884 | A | 10/2000 | Hedrick et al. | |
| 6,213,877 | B1 | 4/2001 | Walker | |
| 6,311,976 | B1 | 11/2001 | Yoseloff et al. | 273/138.2 |
| 6,315,666 | B1 | 11/2001 | Mastera et al. | |
| 6,319,125 | B1 | 11/2001 | Acres | 463/25 |

(Continued)

OTHER PUBLICATIONS

Natsume Inc., Havest Moon Instruction Booklet, 1991 (US released 1997), Nintendo.*

(Continued)

*Primary Examiner* — Dmitry Suhol
*Assistant Examiner* — Andrew Kim
(74) *Attorney, Agent, or Firm* — Neal, Gerber & Eisenberg LLP

(57) ABSTRACT

Systems and methods are provided for providing a player of a gaming device entitlement to a bonus amount, wherein the bonus amount may not be immediately apparent or attainable by the player. A gaming device player may acquire symbols in the context of a reel-based slot machine game. Certain symbols may entitle the player to a bonus payout, the bonus being apparent or attainable by the player at a later point in time and based on certain characteristics associated with the impending benefit. For example, gaming device players may obtain virtual representations of shares of company stock, which may only be sold (yielding a bonus to the player) under certain conditions, as dictated by the gaming device.

16 Claims, 5 Drawing Sheets

(56) References Cited

U.S. PATENT DOCUMENTS

| | | | | |
|---|---|---|---|---|
| 6,358,149 | B1 | 3/2002 | Schneider | |
| 6,398,218 | B1 | 6/2002 | Vancura | 273/138.1 |
| 6,537,150 | B1 | 3/2003 | Luciano et al. | 463/16 |
| 6,599,193 | B2 | 7/2003 | Baerlocher et al. | 463/27 |
| 6,712,695 | B2 | 3/2004 | Mothwurf et al. | 463/25 |
| 6,726,565 | B2 | 4/2004 | Hughs-Baird | 463/25 |
| 6,769,984 | B2 | 8/2004 | Duhamel et al. | 463/20 |
| 6,857,958 | B2 | 2/2005 | Osawa | |
| 6,918,834 | B2 * | 7/2005 | Vancura | 463/25 |
| 7,169,047 | B2 | 1/2007 | Benbrahim | 463/25 |
| 2002/0052232 | A1 * | 5/2002 | Kaminkow | 463/20 |
| 2002/0142846 | A1 | 10/2002 | Paulsen | |
| 2003/0078101 | A1 | 4/2003 | Schneider | |
| 2003/0157978 | A1 * | 8/2003 | Englman | 463/16 |
| 2003/0176210 | A1 | 9/2003 | Vancura | 463/16 |
| 2003/0176217 | A1 | 9/2003 | Vancura | 463/25 |
| 2003/0220135 | A1 | 11/2003 | Gauselmann | 463/25 |
| 2004/0142742 | A1 * | 7/2004 | Schneider et al. | 463/25 |
| 2005/0096114 | A1 * | 5/2005 | Cannon et al. | 463/16 |

OTHER PUBLICATIONS

Harvest Moon (video game)—Wikipedia, the free encyclopedia, http://en.wikipedia.org/wiki/Harvest_Moon_(SNES). Wikipedia. Accessed Apr. 10, 2009.*

Office Action for U.S. Appl. No. 10/793135 dated Feb. 23, 2006, 8pp.

Office Action for U.S. Appl. No. 10/793,135 dated Mar. 20, 2007, 12pp.

Office Action for U.S. Appl. No. 10/793,135 dated Aug. 23, 2007, llpp.

Office Action for U.S. Appl. No. 11/428,427 dated Apr. 2, 2007, 9pp.

Office Action for U.S. Appl. No. 11/428,427 dated Aug. 22, 2007, 7pp.

International Search Report for International Application No. PCT/US04/06560 dated Mar. 8, 2006, 2pp.

Written Opinion for International Application No. PCT/USO4/06560 dated Mar. 8, 2006, 3pp.

Office Action for U.S. Appl. No. 10/793,135 dated Nov. 13, 2006, llpp.

* cited by examiner

SYSTEMS AND METHODS FOR EXECUTING GAMES EMPLOYING BONUS AMOUNTS BASED ON BONUS CHARACTERISTICS

The present application is a continuation of U.S. patent application Ser. No. 10/793,135, entitled "SYSTEMS AND METHODS FOR EXECUTING GAMES EMPLOYING BONUS AMOUNTS BASED ON BONUS CHARACTERISTICS", filed Mar. 3, 2004 now abandoned;

which claims the benefit of priority of U.S. Provisional Patent Application Ser. No. 60/452,079, entitled "SYSTEMS AND METHODS FOR EXECUTING GAMES EMPLOYING BONUS AMOUNTS BASED ON BONUS CHARACTERISTICS", filed Mar. 4, 2003, Each of the above-referenced applications is incorporated by reference herein in its entirety.

BACKGROUND

Many people enjoy the entertainment provided by various types of gaming systems. For example, many people enjoy playing games offered by casinos (e.g. slot machine, video poker and/or table games). In accordance with these types of games, a player may provide a monetary wager in exchange for which the player is provided with a random (or at least partially random) game result. Based on the wager and the game result, the player may become entitled to payment of winnings or an outcome amount.

One reason players enjoy these types of games is the presence of an element of player participation, such as the participation provided by allowing a player to select a wagering strategy or to offer predictions relative to forthcoming game results. Players also enjoy the excitement and gratification provided by the large potential payouts associated with many such games.

Casinos currently utilize several techniques to accommodate and entertain gaming device players. Such techniques include the provision of complimentary goods and services; employing attractive colors, graphics and architectural themes; sound effects associated with winning game results; thematic games (including games based on various elements of popular culture); and jackpots or "bonus rounds" that offer players the chance to win large sums of money in exchange for a comparatively small wager.

A need exists for enhancing the entertainment and overall appeal of gaming systems.

DETAILED DESCRIPTION

Figure 1:
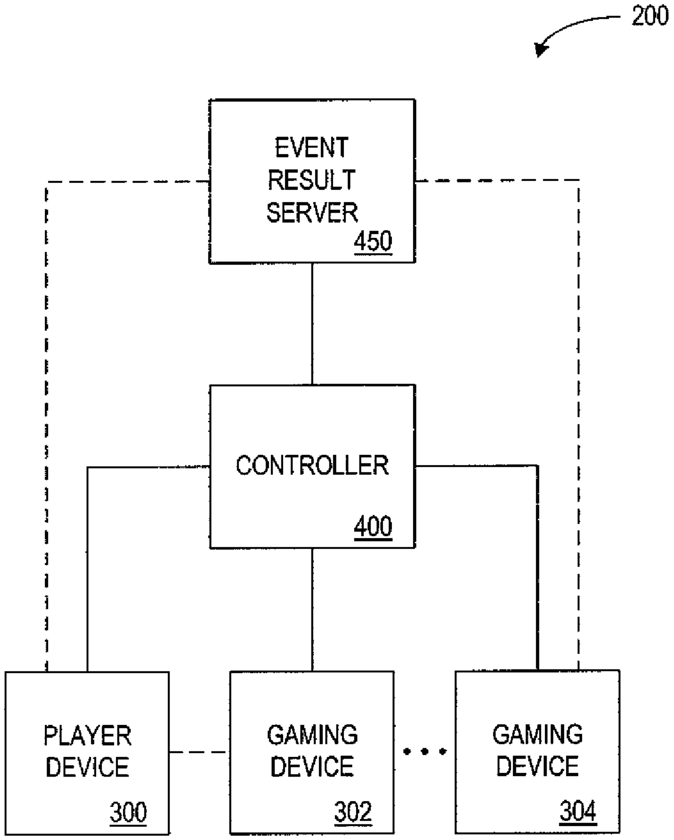
FIG. 1 is a block diagram overview of a gaming system according to an embodiment of the present invention.

Numerous embodiments are described in this application, and are presented for illustrative purposes only. The described embodiments are not intended to be limiting in any sense. The invention is widely applicable to numerous embodiments, as is readily apparent from the disclosure herein.

While the methods and apparatus of the present invention are described herein by way of particular embodiments, those of ordinary skill in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments" "one or more embodiments", "some embodiments", and "one embodiment" mean "one or more embodiments" unless expressly specified otherwise.

Although various examples make reference to a certain number (e.g., by referencing a specific number, by references a plurality, by referencing the indefinite article), different numbers are contemplated unless specifically indicated otherwise.

Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order.

It will be readily apparent that the various methods and algorithms described herein may be implemented by, e.g., appropriately programmed general purpose computers and computing devices. Further, programs which implement such methods and algorithms may be stored and transmitted in a variety of known media.

The steps of processes described herein may be performed in any order practical. Further, some steps may be performed simultaneously.

DEFINITIONS

The following definitions are used herein unless otherwise indicated.

Controller: An electronic device (e.g., a computer) that communicates with one or more gaming devices. The controller may be embodied as a computer server. The controller may (i) control the actions of gaming devices and/or (ii) receive and store information associated with the gaming devices. For example, the controller may employ one or more databases to record gaming device statistics such as e.g. coin-in, coin-out, jackpot information, theoretical wins, etc.

Gaming Device: Any electrical, mechanical, or electro-mechanical device operative to: accept wagers; execute a process to determine a game result and/or outcome amount; based on the game result and/or outcome amount, allocate the outcome amount among a given number of events; and provide entitlement to the outcome amount to a gaming device player. In accordance with a preferred embodiment, the game result and/or outcome amount may be generated or determined randomly (e.g. as with a slot machine). Alternatively, the game result and/or outcome amount may be generated or determined via a combination of randomness and player skill (e.g. as with video poker). In accordance with embodiments of the present invention, gaming devices may include slot machines (both video reel and mechanical reel), video poker machines, video blackjack machines, video roulette machines, video keno machines, video bingo machines, pachinko machines, video lottery terminals, hand held gaming devices, and the like.

Payout Amount, Outcome Amount: The total value to be entitled to a gaming device player in accordance with a game result. As discussed above, the total payout may be randomly determined in response to a player establishing a wager at a gaming device. The total payout may be calculated based on a wager amount associated with a given spin or handle pull at the gaming device and/or determined based on an applicable pay table or given rule.

Parameter: Information associated with a player and based on which a payout amount is determined. For example, a parameter may be embodied as a duration of time or number of handle pulls completed by a player at a gaming device. Alternatively, a parameter may be embodied as a wager amount (e.g. an average wager amount) associated with one or more individual spins or handle pulls.

Spin/Handle Pull: An occurrence of the determination of a game result. In accordance with various embodiments of the present invention, a spin/handle pull yields a payout amount that may be communicated to a player via the gaming device. A gaming device player may initiate a spin by depositing currency or establishing credit with a gaming device and subsequently actuating a lever or designated button.

Bonus Amount: A value or factor (e.g., multiplier) based on which a player may be entitled to a monetary payment. Generally, a bonus amount is associated with a bonus characteristic. For example, a bonus amount may be determined by a gaming device based on a parameter and/or a bonus characteristic.

Bonus Characteristic: A quality or property associated with a game element based on which a gaming device may determine a payout amount. For example, a player at a gaming device may acquire certain symbols throughout the course of game play. The acquired symbols may mature or increase in value over time and/or over a given number of handle pulls (e.g. the level of maturity may be regarded as a bonus characteristic).

Embodiments of the invention provide systems and methods for executing games that employ benefits (e.g., bonus amounts) that are based on various characteristics.

In accordance with an embodiment of the present invention, the availability of a benefit such as a bonus amount is indicated to a player. Throughout the course of game play one or more characteristics associated with the benefit are determined, and the benefit (e.g., bonus amount) is adjusted accordingly. For example, a player of a gaming device (e.g., a slot machine, a video poker machine) may be informed of the availability of a bonus amount in any of a number of known manners (e.g., a graphical message displayed on a video monitor of the gaming device).

However, in one embodiment the value of the benefit may be hidden from the player, e.g., until the benefit is redeemed, until a particular milestone is achieved. The player might not be informed of the specific bonus amount (e.g. the actual dollar amount of the bonus) until the player applies certain characteristics to the bonus. For example, in order to apply certain characteristics to a bonus amount, the player may be required to attain one or more specific symbols within the context of a slot machine-type game which includes a plurality of reels with symbols thereon. In accordance with another embodiment, the player may be required (i) to execute a given number of handle pulls and/or (ii) to maintain a particular rate of play (e.g., average number of spins per hour) in order to apply one or more characteristics to the benefit.

Upon a player applying one or more characteristics to a benefit, the benefit may then be disclosed to the player (e.g. the player may be informed of a dollar amount associated with the bonus) and the benefit may then be entitled to the player. A benefit may be "entitled" or awarded to a player by dispensing coins, tokens or other currency to the player at a gaming device; by printing a receipt redeemable for the benefit and providing the receipt to the player; or in any other practicable manner.

For example, in accordance with an embodiment of the invention described herein, a player of a gaming device, such as a slot machine, may be informed of the availability of a benefit at the beginning of play. For example, the player may initiate play at the gaming device by inserting currency or otherwise establishing a balance with the gaming device. Thereafter, the gaming device may inform the player that the player is entitled to a bonus (i.e. other than amounts of payouts from wagers) upon the conclusion of play. The gaming device may refrain from informing the player of the exact amount or type of bonus to be provided until the conclusion of play.

The bonus to which the player is entitled may be affiliated with a theme to make play more enjoyable. For example, bonuses may be affiliated with a stock market theme. Throughout the course of play a player may be informed of an available bonus via the acquisition of representative "shares" in various companies. For example, the player may acquire a share of "Company A" any time a reel symbol depicting a Company A stock certificate appears on the payline of the gaming device throughout the course of play. The player may continue playing the gaming device and acquiring additional shares in one or more "companies" until a certain point in the game, as determined by the gaming device. For example, the player may accrue shares until a symbol representing the closing of the stock market appears on the gaming device payline. At that point, the gaming device may assign a value to each share of each company held by the player. For example, the shares may have a first price at one point in time (e.g. when acquired by the player) and a second price at a later point in time (e.g. market closing). During play, the value of the shares may increase, decrease, or remain unchanged.

The player may elect to "sell" his shares and thereby redeem the shares for their corresponding value (as previously determined by the gaming device). Alternatively, the player may hold the shares in an attempt to realize greater value at a later point in the game. In this manner, the player is aware of the benefit but is not necessarily aware of the total value of the benefit during the course of play. In other words, the actual amount of the benefit may only be understood by the player after the acquisition or entitlement of the benefit.

According to another embodiment, the bonus may be affiliated with a gardening theme. In accordance with this particular theme, a player may acquire graphical representations of seeds (a benefit) throughout the course of game play in an attempt to establish a garden, wherein the yield of the garden may establish the basis for providing the player with a monetary bonus (a bonus amount). The player may elect to "plant" the acquired seeds (e.g., in a graphical representation of a garden bed) in an attempt to "grow" a variety of plants. Based on a determination by the gaming device, some of the seeds may germinate and begin to produce crops, while others may fail to germinate at all or produce only food incapable of being harvested. The growing of the plants, etc. may be displayed, thus representing the value of the benefit the player is entitled to.

Based on the results of the planting and the growth of the virtual plants, the gaming device may determine a bonus amount to be provided to the player (e.g. the player may receive one bonus coin for each pound of crops harvested). In this manner, a player may be awarded with or informed of the availability of a bonus or benefit (by acquiring "seeds") without immediately realizing the actual bonus amount associated with the benefit (i.e. the player may only realize a monetary bonus when the success of the crop is determined).

In accordance with this example, the characteristics associated with various bonus elements may be also be acquired by the player throughout the course of game play. For example, a player may collect elements required to nourish the garden in the hopes of achieving a favorable bonus amount (e.g. the player may collect a representation of water or of sunlight, which may beneficially affect the garden's growth, to what extent may be initially unknown to the player).

According to an embodiment of the present invention, the bonus may be affiliated with a grocery-shopping theme. A player may attempt to navigate a graphical representation of a grocery store in an effort to acquire items from a shopping list. The player may "acquire" various items by way of the occurrence of icons representing those items appearing on the payline of a gaming device.

As the player acquires items, the status of those items (a characteristic) may begin to slowly deteriorate (e.g. produce may become wilted, ice cream may begin to melt, etc.) while the player is navigating the store. A player may also acquire a symbol (e.g., a 'jar' symbol) which preserves food, or prevents it from deteriorating as fast. In order to obtain a bonus, the player may need to acquire a "checkout" symbol by way of the occurrence of such a symbol on the gaming device's payline, and within the context of a reel-based slot machine game. Once the player has acquired a checkout symbol, the status of all acquired items may be evaluated and a bonus may be provided to the player (e.g. in a manner described above).

Many other themes may be employed to enhance the excitement of play.

In accordance with an embodiment of the invention, the benefit need not be limited to currency or an indication of payment to the player. The benefit to be entitled to the player may include beneficially modifying various attributes of a gaming device game. For example, the pay schedule of the gaming device of the player may be beneficially improved, thereby affording the player, e.g., a lower house edge, a higher jackpot amount.

In accordance with an embodiment of the invention, the provision of a benefit to a player may comprise entitling the player to a randomly determined payout amount or to one or more chances to acquire a randomly determined payout amount. In this manner, the player may be awarded with the opportunity to achieve monetary gains, rather than necessarily be awarded with the gains themselves.

In accordance with one embodiment of the invention, the player may be informed of a benefit at a first point in time and prevented from obtaining the benefit until at least a second, later point in time (e.g. 1 hour later).

Referring to FIG. 1, an embodiment of the present invention may be configured to work in a network 200 which including a controller computer 400 (e.g., a slot server of a casino) that is in communication, via a communications network, with one or more gaming devices 302, 304 (e.g., slot machines, video poker machines). The controller computer may communicate with the gaming devices directly or indirectly, via a wired or wireless medium such as the Internet, LAN, WAN or Ethernet, Token Ring, or via any appropriate communications means or combination of communications means. Each of the gaming devices may comprise computers, such as those based on the Intel® Pentium® processor, that are adapted to communicate with the controller computer. Any number and type of devices may be in communication with the controller computer.

In some embodiments, an event result server 450 may communicate with the controller computer and/or the gaming devices. The event result server may provide "overarching" event results (e.g., specific outcomes, pay tables and/or probability distributions) which affect or dictate the outcomes of a gaming device. Such functionality need not be present, and if present may be integrated into the controller computer, as desired.

In one embodiment, employing a separate computer controller and event result server permits a "three-tiered architecture", as is known in the art. Some possible advantages of a three-tiered architecture include, e.g., increased processing efficiency, increased transmission rate of data, the security of redundancy. In addition, in an embodiment, the event result server may be in communication with a plurality of computer controllers (e.g., a different computer controller for each of a rooms in a casino, a different computer controller for each of a plurality of casinos). In such an embodiment, the event result server can serve as a centralized repository for certain information, and also allow unified control or direction of a plurality of controller computers and associated gaming devices.

Communication between the devices, the controller computer and the event result server, and among the devices, may be direct or indirect, such as over the Internet through a Web site maintained by computer on a remote server or over an on-line data network including commercial on-line service providers, bulletin board systems and the like. In yet other embodiments, the devices may communicate with one another and/or the controller computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those of ordinary skill in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, a server computer may not be necessary and/or preferred. For example, the present invention may, in one or more embodiments, be practiced on a stand-alone gaming device and/or a gaming device in communication only with one or more other gaming devices. In such an embodiment, any functions described as performed by the controller computer or data described as stored on the controller computer may instead be performed by or stored on one or more gaming devices.

According to another embodiment of the present invention, a controller computer (e.g., a slot server of a casino) is in communication, via a communications network, with one or more gaming devices (e.g., slot machines, video poker machines). A difference between the aforementioned system and this alternative system is that in this system at least one gaming device is also in communication with one or more player devices 300. A player device may, in turn, be in communication with a player device server and, in some embodiments, with the controller computer. In one or more embodiments the player device server may be in communication with one or more gaming devices and/or controller computer. It is apparent that a single device (e.g., a single server) may perform the functions of both the player device server and the controller computer.

The controller computer may communicate with the devices and player devices directly or indirectly, via a wired or wireless medium such as the Internet, LAN, WAN or Ethernet, Token Ring, or via any appropriate communications means or combination of communications means. For example, the controller computer may communicate directly with one of the gaming devices (e.g., via a LAN) and indirectly (e.g., via a gaming device) with a player device. In another example, the controller computer may communicate with one of the gaming devices via a LAN and with another of the gaming devices via the Internet (e.g., if the particular gaming device comprises a personal computer in communication with an online casino).

Each of the devices may comprise computers, such as those based on the Intel® Pentium® processor, that are adapted to communicate with the controller computer. Further, each of the devices may comprise a gaming device such as a mechanical or electronic slot machine, a video poker machine, a video blackjack machine, a video keno machine, a pachinko machine, a video roulette machine, and/or a lottery terminal. Further yet, each of the devices may comprise an external or internal module associated with one or more of the gaming devices that is capable of communicating with one or more of the gaming devices and of directing the one or more gaming devices to perform one or more functions. Any number of devices may be in communication with the controller computer. Any number and type of player devices may be in communication with a gaming device, player device server and the controller computer.

Communication between the devices and the controller computer, between the devices, between the player device server and the devices, and between the player device server and the controller computer, may be direct or indirect, such as over the Internet through a Web site maintained by the controller computer on a remote server or over an on-line data network including commercial on-line service providers, bulletin board systems and the like. In yet other embodiments, any and all of the devices of the system (i.e., the devices, the controller computer, and the player device server) may communicate with one another over RF, cable TV, satellite links and the like.

Some, but not all, possible communication networks that may comprise the network or otherwise be part of the system include: a local area network (LAN), a wide area network (WAN), the Internet, a telephone line, a cable line, a radio channel, an optical communications line, a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

In an embodiment, the controller computer may not be necessary and/or preferred. For example, the present invention may, in one or more embodiments, be practiced on a stand-alone gaming device, one or more gaming devices in communication with one or more player devices, one or more gaming devices in communication with a player device server, one or more player devices in communication with a player device server, and/or a gaming device in communication only with one or more other gaming devices. In such an embodiment, any functions described as performed by the controller computer or data described as stored in a memory of the controller computer may instead be performed by or stored on one or more gaming devices, one or more player devices, and/or player device server.

Similarly, a player device server may not be desired and/or needed in some embodiments of the present invention. In embodiments that do not involve a player device server, any or all of the functions described herein as being performed by a player device server may instead be performed by the controller computer, one or more gaming devices, one or more player devices, or a combination thereof. Similarly, in embodiments that do not involve a player device server, any data described herein as being stored in a memory of a player device server may instead be stored in a memory of another server computer, one or more gaming devices, one or more player devices, or a combination thereof.

Any or all of the gaming devices may, respectively, include or be in communication with a player device. A player device may be a device that receives information from (and/or transmits information to) one or more gaming devices. For example, a player device may be operable to receive information about games being played on a gaming device, such as the initiation of a game and/or a random number that has been generated for a game.

In one or more embodiments, one or more such player devices may be in communication with a player device server. This allows the player device server to receive information regarding a plurality of games being played on a plurality of gaming devices. The player device server, in turn, may be in communication with the controller computer. It should be understood that any functions described herein as performed by a player device may also or instead be performed by the player device server. Similarly, any data described herein as being stored on or accessed by a player device may also or instead be stored on or accessed by the player device server.

A player device may be operable to access a database (e.g., of a player device server) to provide benefits (e.g., cashless gaming receipts) based on, for example, an actual outcome of a game.

The player device server may also monitor player gambling history over time by associating gambling behavior with player identifiers, such as player tracking card numbers. For example, information about the player obtained or accessed by a player device server may be analyzed, e.g., to identify those players that a particular gaming machine owner, operator, or manufacturer finds most desirable. Based upon desired objectives, the player device server may direct the appropriate player device to issue customized benefits, bonuses, messages, offers, and games to specific players.

Information received by a player device from a gaming device may include gambling data such as number of games initiated per unit of time, outcomes displayed for games initiated, payouts corresponding to outcomes displayed, a credit meter balance of the gaming device, and/or data associated with the player currently playing the gaming device.

The functions described herein as being performed by a player device server and/or a player device may, in one or more embodiments, be performed by the controller computer (in lieu of or in conjunction with being performed by a player device server and/or a player device).

In one or more embodiments, a player device may be useful for implementing the embodiments of the present invention into the operation of a conventional gaming device. For example, in order to avoid or minimize the necessity of modifying or replacing a program already stored in a memory of a conventional gaming device, an external or internal module that comprises a player device may be inserted in or associated with the gaming device.

For example, a player device may be employed to monitor play of the gaming device, output messages and output an outcome of a game. In such embodiments the gaming device with which the player device is in communication may continue to operate conventionally. In such embodiments the gaming device may continue to output an outcome for each game played. The player device, however, may output a second outcome or payout when appropriate. The player device may also output messages to the player. The player device may also provide benefits to a player (e.g., coins, tokens, electronic credits, paper receipts exchangeable for cash, services, and/or merchandise).

Accordingly, a player device may include (i) a communications port (e.g., for communicating with one or more gaming devices, player device server, another player device, and/or computer; (ii) a display (e.g., for displaying messages and/or outcomes and payouts), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the player device may not output outcomes and/or messages to a player but may instead direct the processor of a gaming device to perform such functions. For example, a program stored in a memory of player device may cause a processor of a gaming device to perform certain functions. For example, a program stored in a memory of player device may cause a processor of a gaming device to output an outcome, determine an outcome, output a message, access a database, provide a benefit, refrain from providing a benefit (e.g., by not sending a signal to a hopper controller of the gaming device when it otherwise normally would), and/or communicate with another device. Examples of player devices include (1) electronic apparatuses "retrofitted" to conventional gaming devices so that inventive processes disclosed herein may be realized through game play at the gaming device, (2) Personal Digital Assistants such as those manufactured by Palm, Inc., (3) lap top computers, (4) cellular telephones, (5) pagers, or (6) any combination thereof.

The gaming device may be implemented as a system controller, a dedicated hardware circuit, an appropriately programmed general-purpose computer, or any other equivalent electronic, mechanical or electro-mechanical device. The gaming device may comprise, for example, a slot machine, a video poker machine, a video blackjack machine, a video keno machine, a video lottery machine, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a personal digital assistant, a cellular telephone, a Nintendo GameBoy®). The gaming device may comprise any or all of the gaming devices of the aforementioned systems.

In some embodiments, a user device such as a PDA or cell phone may be used in place of, or in addition to, some or all of the gaming device components. Further, a gaming device may comprise a personal computer or other device operable to communicate with an online casino and facilitate game play at the online casino. In one or more embodiments, the gaming device may comprise a computing device operable to execute software that simulates play of a reeled slot machine game, video poker game, video blackjack game, video keno game, video roulette game, or lottery game.

Figure 2:
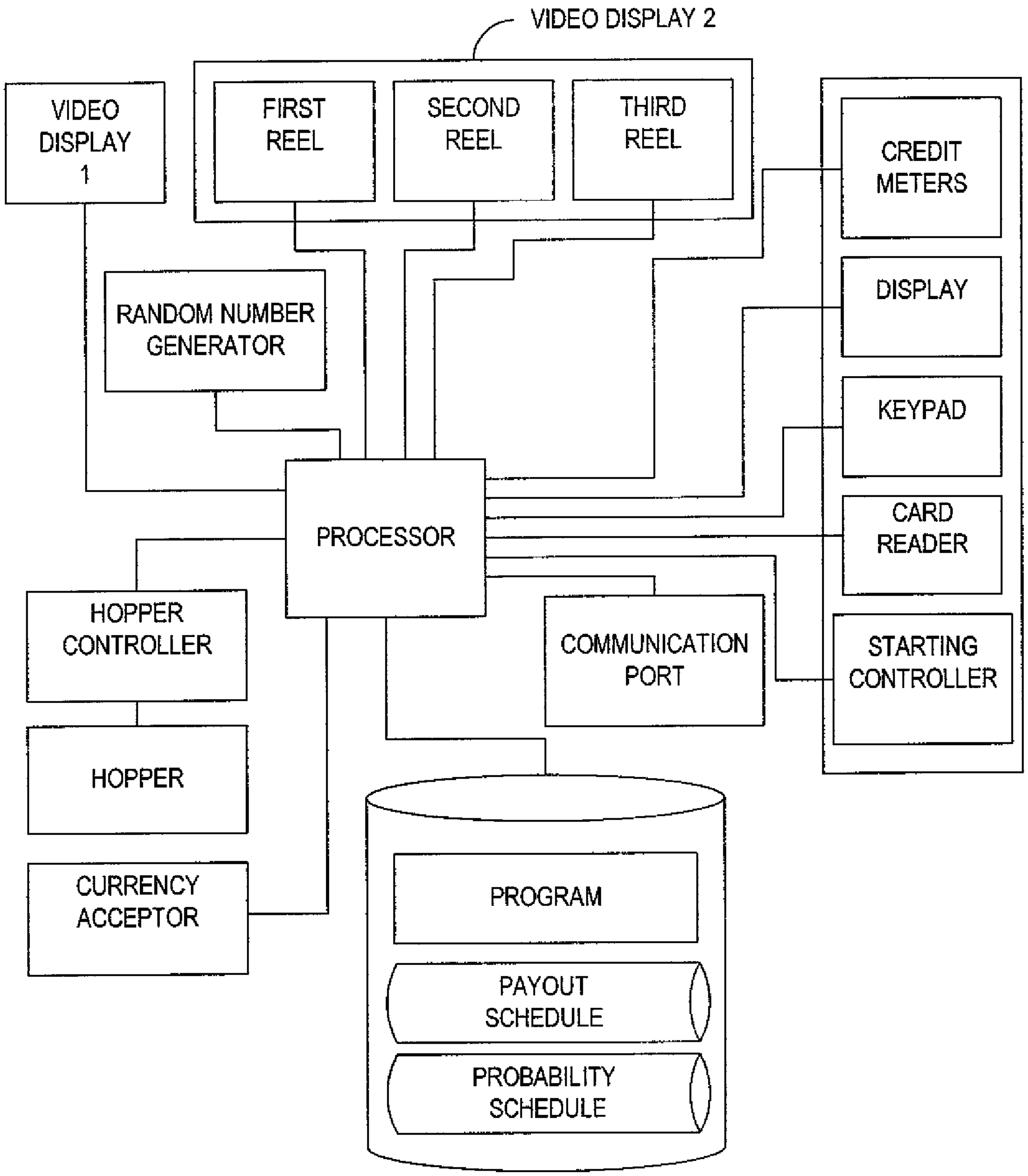
FIG. 2 is a block schematic diagram of a gaming device according to an embodiment of the present invention.

FIG. 2 illustrates an embodiment of a gaming device, though many variations on the depicted embodiment are readily apparent to one of ordinary skill in the art. Additionally, many variants are disclosed herein, and the present invention is not limited to a particular embodiment of gaming device.

The gaming device comprises a processor, such as one or more Intel® Pentium® processors. The processor is operable to communicate with a random number generator, which may be a component of the gaming device. The random number generator, in accordance with at least one embodiment of the present invention, may generate data representing random or pseudo-random values (referred to as "random numbers" herein). The random number generator may generate a random number every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor.

Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor may also be operable to communicate with a benefit output device, which can be but need not be a component of gaming device. The benefit output device may comprise one or more devices for outputting a benefit to a player of the gaming device. For example, in one embodiment the gaming device may provide coins and/or tokens as a benefit. In such an embodiment the benefit output device may comprise a hopper and hopper controller, for dispensing coins and/or tokens into a coin tray of the gaming device. In another example, the gaming device may provide a receipt or other document on which there is printed an indication of a benefit (e.g., a cashless gaming receipt that has printed thereon a monetary value, which is redeemable for cash in the amount of the monetary value). In such an embodiment the benefit output device may comprise a printing and document dispensing mechanism. Similarly, the benefit output device may comprises a cashless gaming device which reads tickets and dispenses tickets, such as the EZPay™ device sold by International Game Technology.

In yet another example, the gaming device may provide electronic credits as a benefit (which, e.g., may be subsequently converted to coins and/or tokens and dispensed from a hopper into a coin tray). In such an embodiment the benefit output device may comprise a credit meter balance (e.g., as displayed on one or more video displays) and/or a processor that manages the amount of electronic credits that is indicated on a display of a credit meter balance. In yet another example, the gaming device may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained. Note that, in one or more embodiments, the gaming device may include more than one benefit output device. For example, the gaming device may include both a hopper and hopper controller combination and a credit meter balance. Such a gaming device may be operable to provide more than one type of benefit to a player of the gaming device. A single benefit output device may be operable to output more than one type of benefit. For example, a benefit output device may be operable to increase the balance of credits in a credit meter and communicate with a remote device in order to increase the balance of a financial account associated with a player.

The processor is also operable to communicate with a display device, which may be a component of gaming device. The display device may comprise, for example, one or more video displays or areas for outputting information related to game play on the gaming device, such as a cathode ray tube (CRT) monitor, liquid crystal display (LCD) screen, or light emitting diode (LED) screen. In one or more embodiments, a gaming device may comprise more than one video display devices. For example, a gaming device may comprise an LCD display for displaying electronic reels and a display area that displays rotating mechanical reels.

The processor may also be in communication with one or more other devices besides the display device, for outputting information (e.g., to a player or another device). Such other one or more output devices may also be components of a gaming device. Such other one or more output devices may comprise, for example, an audio speaker (e.g., for outputting an outcome or information related thereto, in addition to or in lieu of such information being output via a display device), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). In one or more embodiments, the gaming device may include more than one display device, one or more other output devices, or a combination thereof (e.g., two display devices and two audio speakers).

The processor may also be in communication with an input device, which is a device that is capable of receiving an input (e.g., from a player or another device) and which may be a component of gaming device. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader (or other card reader) to read a player tracking card inserted into a gaming device, a touch screen for input of player selections during game play, and a coin and bill acceptor. Many types of input devices can function (exclusively or partially) as a starting controller which initiates a spin of the gaming device. Handles and buttons are very common types of starting controllers.

The processor may also be in communication with a payment system, which may be a component of the gaming device. The payment system is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e., coins or bills), and accordingly the payment system may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

The processor is in communication with a memory and a communications port (e.g., for communicating with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example; (i) located entirely within a single computer or other device; or (ii) connected to each other by a remote communication medium, such as a serial port cable, telephone line or radio frequency transceiver. In one embodiment, the gaming device may comprise one or more devices that are connected to a remote server computer for maintaining databases.

The memory stores a program for controlling the processor. The processor performs instructions of the program, and thereby operates in accordance with the methods described in detail herein. The program may be stored in a compressed, uncompiled and/or encrypted format. The program furthermore includes program elements that may be necessary, such as an operating system, a database management system and "device drivers" for allowing the processor to interface with computer player devices. Appropriate program elements are known to those of ordinary skill in the art, and need not be described in detail herein.

The term “computer-readable medium” as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes described herein. Thus, embodiments of the present invention are not limited to any specific combination of hardware and software. As discussed with respect to aforementioned systems, execution of sequences of the instructions in a program of a player device in communication with the gaming device may also cause the processor to perform some of the process steps described herein.

The memory may also store one or more database(s), including e.g. a probability database, a payout database and a bonus characteristic database. Some or all of the data stored in each database is described in conjunction with the following description of the process steps. The described entries of the databases represent exemplary information only; those of ordinary skill in the art will understand that the number and content of the entries can be different from those illustrated herein. Further, despite any description of the databases as tables, an object-based model could be used to store and manipulate the data types and likewise, object methods or behaviors can be used to implement the processes described herein.

Note that, although these databases may be described as being stored in a gaming device, in other embodiments of the present invention some or all of these databases may be partially or wholly stored in another device, such as one or more of the player devices, the player device server and/or the server computer. Further, some or all of the data described as being stored in the databases may be partially or wholly stored (in addition to or in lieu of being stored in the memory of the gaming device) in a memory of one or more other devices, such as one or more of the player devices, another gaming device, the player device server and/or the controller computer.

In one or more embodiments, the gaming device may take the form of a slot machine. In light of the present disclosure, gaming devices may be readily configured to operate as specified herein. A description of a slot machine suitable for use with various embodiments follows.

Figure 3:
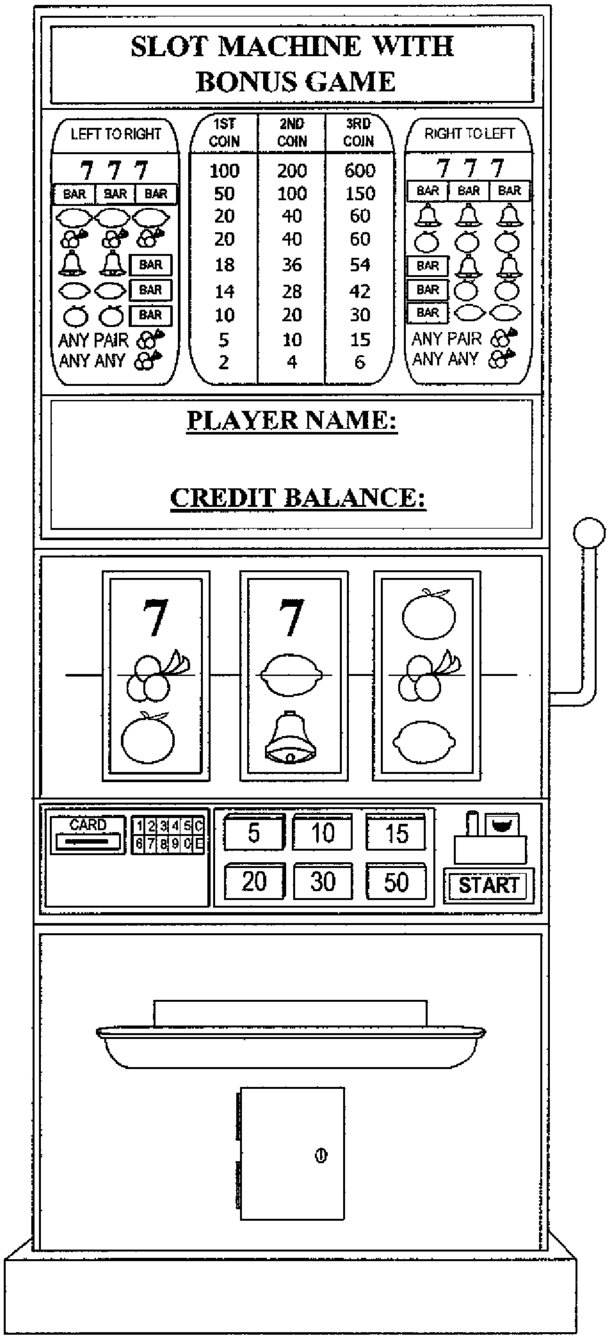
FIG. 3 illustrates a gaming device, such as a slot machine, which may be employed according to an embodiment of the present invention.

Generally, a slot machine can comprise, e.g., a three reel or five reel slot machine. Referring to FIG. 3, a slot machine illustrated therein comprises a display area in which an outcome for a game of the slot machine is displayed to the player. The display area may, for example, be a video display that displays graphical representations of reels. In another example, the display area may be glass behind which are located mechanical reels. Within the display area is a payline. In accordance with one or more embodiments of the present invention, an outcome of a game is a set of symbols displayed along a payline of a reeled slot machine. The slot machine may further comprise a handle. A player may initiate the movement of the reels in the display area by pulling on the handle. Alternatively, a player may initiate the movement of the reels in the display area by actuating one or more start buttons. Either or both of the handle and start button are exemplary embodiments of the input device, described herein.

Where appropriate, the slot machine may also include an alternate, secondary video display, for outputting information to a player. The secondary video display may be utilized, for example, to inform a player of which outcome is an actual outcome or that an outcome that is currently being output is not the actual outcome. The secondary display may also indicate, e.g., the correct value of a benefit.

The slot machine may also include a payment system, which is comprised of a bill acceptor, a credit card reader, and a coin acceptor. A player may utilize payment system to provide a wager for playing a game and or for providing payment for provision of an outcome.

The slot machine may further comprise a credit meter balance, which is an exemplary embodiment of a benefit output device that was described herein. The credit meter balance reflects the amount of electronic credits currently available to a player. The electronic credits may be used by a player, for example, as wagers for games played on the gaming device. The electronic credits may also be “cashed out” as coins, bills, tokens, a cashless gaming receipt, and/or credits to another financial account associated with the player.

Finally, the slot machine may comprise a coin tray. Payment to the player may be rendered by dispensing coins into the coin tray. Such coins may be dispensed based on, for example, a player's indication that the player would like to cash out his credit meter balance and/or a payout obtained by a player as a result of playing a game on the slot machine. The coin tray is an exemplary embodiment of the benefit output device, described herein. Note that, where appropriate, the slot machine may include different and/or additional components besides those discussed in this section.

Where appropriate, a probability database may be utilized in the performance of the inventive processes described herein. A probability database may be stored in the data storage device in tabular form, or any other appropriate database form, as is well known in the art. The data stored therein may include a number of exemplary records or entries, each defining a random number. Those of ordinary skill in the art will understand that the probability database may include any number of entries. The tabular representation may also define fields for each of the entries or records. The fields may specify: (i) a random number or range of random numbers that may be generated by the random number generator; and (ii) an outcome, that indicates the one or more indicia comprising the outcome that corresponds to the random number of a particular record. A gaming device may utilize a probability database to determine, for example, what outcome corresponds to a random number generated by a random number generator and to display the determined outcome. The outcomes may comprise the three symbols to be displayed along the payline of a three-reel slot machine.

Other arrangements of probability databases are possible. For example, the book "Winning At Slot Machines" by Jim Regan (Carol Publishing Group Edition, 1997) illustrates many examples of payout and probability tables and how they may be derived. The entirety of this book is incorporated by reference herein for all purposes.

Where appropriate, a prior art payout database may be utilized in the performance of the inventive processes described herein. A payout database may be stored in the data storage device in tabular form, or any other appropriate database form, as is well known in the art. The data stored therein includes a number of example records or entries, each defining an outcome that may be obtained on a gaming device that corresponds to a payout. Those of ordinary skill in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three-reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived. The entirety of this book is incorporated by reference herein for all purposes.

Figure 4:
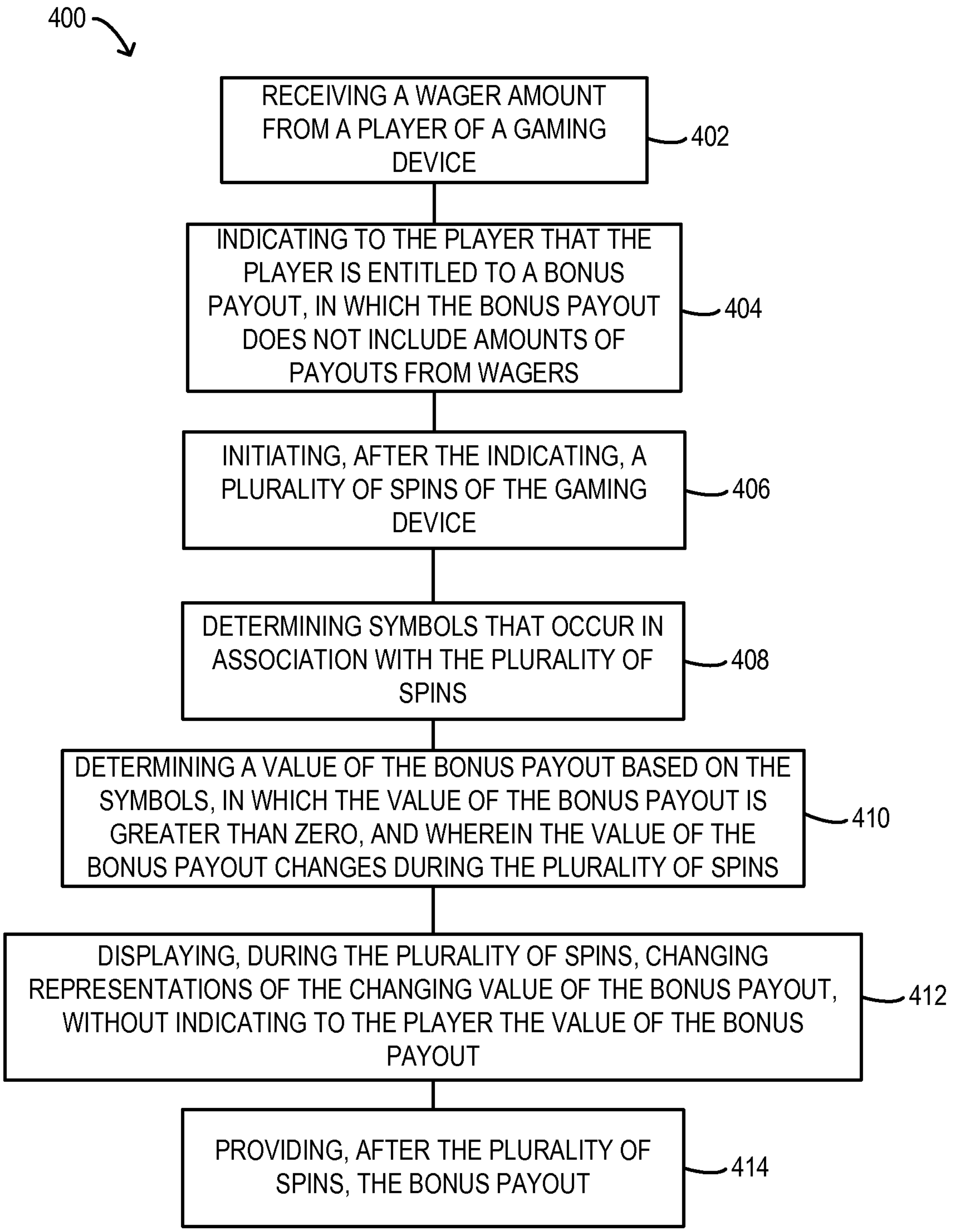
FIG. 4 and FIG. 5 are flowcharts of methods according to some embodiments.

FIG. 4 is a flowchart illustrating a method 400 according to some embodiments. In some embodiment, the method 400 may initiate by receiving a wager amount from a player of a gaming device, at 402. The method 400 may also or alternatively comprise indicating to the player that the player is entitled to a bonus payout, in which the bonus payout does not include amounts of payouts from wagers, at 404. The method 400 may also or alternatively comprise initiating, after the indicating, a plurality of spins of the gaming device, at 406. The method 400 may also or alternatively comprise determining symbols that occur in association with the plurality of spins, at 408. The method 400 may also or alternatively comprise determining a value of the bonus payout based on the symbols, in which the value of the bonus payout is greater than zero, and wherein the value of the bonus payout changes during the plurality of spins, at 410. The method 400 may also or alternatively comprise displaying, during the plurality of spins, changing representations of the changing value of the bonus payout, without indicating to the player the value of the bonus payout, at 412. The method 400 may also or alternatively comprise providing, after the plurality of spins, the bonus payout, at 414.

Figure 5:
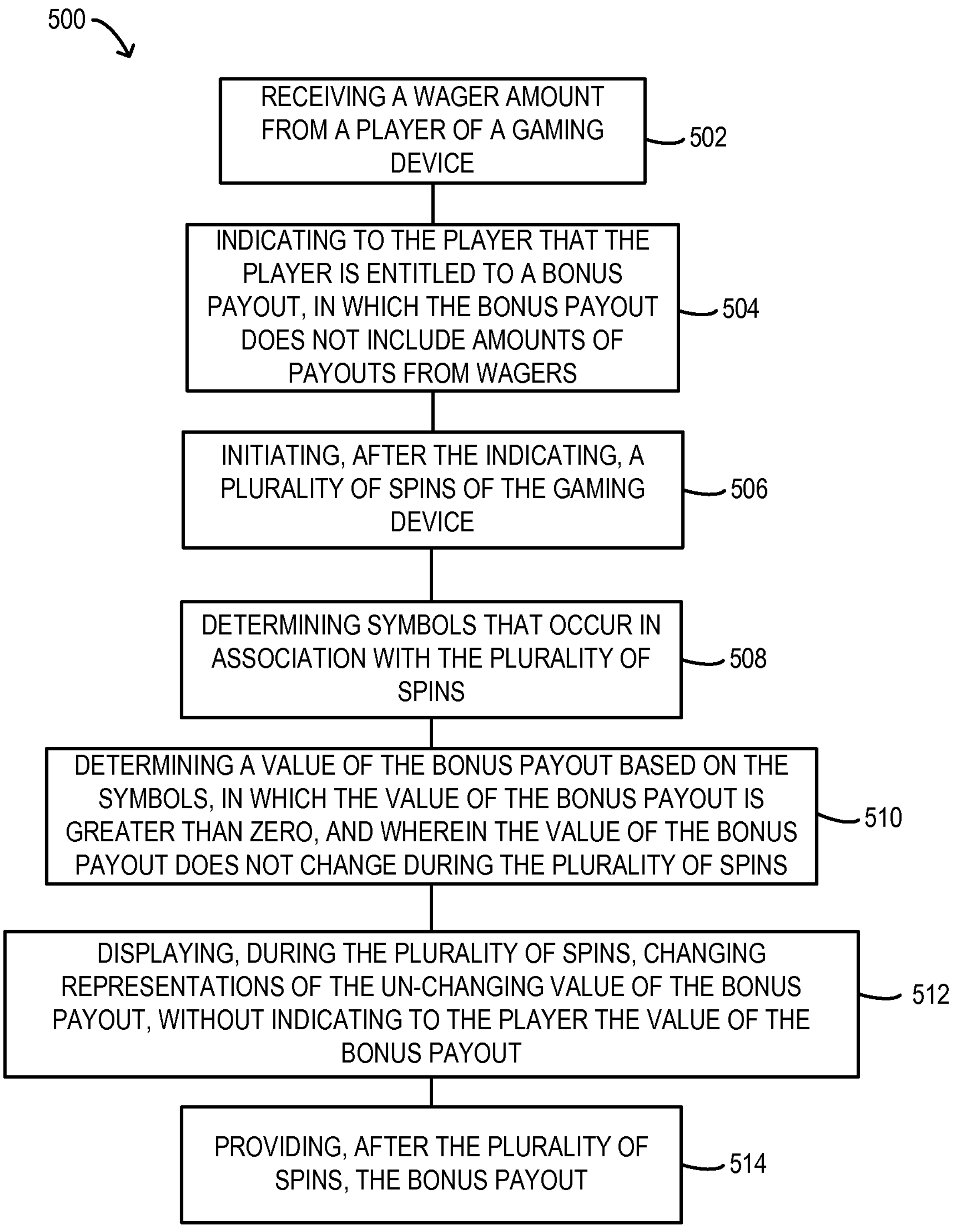

FIG. 5 is a flowchart illustrating a method 500 according to some embodiments. In some embodiment, the method 500 may initiate by receiving a wager amount from a player of a gaming device, at 502. The method 500 may also or alternatively comprise indicating to the player that the player is entitled to a bonus payout, in which the bonus payout does not include amounts of payouts from wagers, at 504. The method 500 may also or alternatively comprise initiating, after the indicating, a plurality of spins of the gaming device, at 506. The method 500 may also or alternatively comprise determining symbols that occur in association with the plurality of spins, at 508. The method 500 may also or alternatively comprise determining a value of the bonus payout based on the symbols, in which the value of the bonus payout is greater than zero, and wherein the value of the bonus payout does not change during the plurality of spins, at 510. The method 400 may also or alternatively comprise displaying, during the plurality of spins, changing representations of the un-changing value of the bonus payout, without indicating to the player the value of the bonus payout, at 512. The method 500 may also or alternatively comprise providing, after the plurality of spins, the bonus payout, at 514.

The flow diagrams described herein (e.g., of the methods 400 and 500) do not necessarily imply a fixed order to the actions (unless otherwise specified), and embodiments may be performed in any order that is practicable. Note that any of the methods 400, 500 described herein may be performed by hardware, software (including microcode), firmware, or any combination thereof. For example, a storage medium may store thereon instructions that when executed by a machine result in performance according to any of the embodiments described herein.

We claim:

1. A method, comprising:

receiving a wager amount from a player of a gaming device;

causing at least one display device to display to the player that the player is entitled to a bonus payout, in which the bonus payout is in addition to any primary game payouts;

thereafter, causing the at least one display device to display a plurality of spins of a plurality of reels of a primary game of the gaming device, wherein the plurality of spins occur within a single session played by the player and wherein each spin of the plurality of spins results in a display of at least one primary game symbol of a plurality of different primary game symbols;

after each spin of the plurality of spins, causing at least one processor to execute a plurality of instructions to determine a numerical value of the bonus payout based on any displayed designated primary game symbols, in which the determined numerical value of the bonus payout is greater than zero;

after each spin of the plurality of spins, causing the at least one display device to display a representation of the determined numerical value of the bonus payout without indicating to the player the determined numerical value of the bonus payout, wherein if one of the displayed symbols is a first designated symbol, said first designated symbol causes an increase in the determined numerical value of the bonus payout and causes a change in the representation of the determined numerical value of the bonus payout to indicate the increase in the determined numerical value of the bonus payout without indicating to the player the amount of increase in the determined numerical value of the bonus payout, and wherein if another one of the displayed symbols is a second designated symbol, said second designated symbol causes a decrease in the determined numerical value of the bonus payout and causes a change in the representation of the determined numerical value of the bonus payout to indicate the decrease in the determined numerical value of the bonus payout without indicating to the player the amount of decrease in the determined numerical value of the bonus payout;

after all of the spins of the plurality of spins, causing the at least one display device to display the determined numerical value of the bonus payout; and after all of the spins of the plurality of spins, causing the determined numerical value of the bonus payout to be provided.

2. The method of claim 1, wherein the representation includes a graphical representation of a plant life, and causing the graphical representation of the plant life to change in a positive manner when one of the displayed designated symbols causes an increase in the determined numerical value of the bonus payout.

3. The method of claim 2, which includes changing the graphical representation of the plant life in a positive manner as one or more of: (i) causing the at least one display device to display a representation of plant growth; (ii) causing the at least one display device to display a representation of plant crop production; and (iii) causing the at least one display device to display a representation of crop harvest yield.

4. The method of claim 1, wherein the representation includes a graphical representation of a plant life, and causing the graphical representation of the plant life to change in a negative manner when one of the displayed designated symbols causes a decrease in the determined numerical value of the bonus payout.

5. The method of claim 1, wherein the representation includes a graphical representation of a grocery item, and causing the graphical representation of the grocery item to change in a positive manner when one of the displayed designated symbols causes an increase in the determined numerical value of the bonus payout.

6. The method of claim 5, which includes changing the graphical representation of the grocery item in a positive manner as causing the at least one display device to display a representation of a preservation of the grocery item.

7. The method of claim 1, wherein the representation includes a graphical representation of a grocery item, and causing the graphical representation of the grocery item to change in a negative manner when one of the displayed designated symbols causes a decrease in the determined numerical value of the bonus payout.

8. The method of claim 7, which includes changing the graphical representation of the grocery item in a negative manner as one or more of: (i) causing the at least one display device to display a representation of grocery item wilting; and (ii) causing the at least one display device to display a representation of grocery item melting.

9. A method, comprising:

providing, by a wagering game device, a primary wagering game to a player;

allowing, by the wagering game device, the player to initiate a plurality of game starts of the primary wagering game, wherein the allowing comprises receiving, for each game start of the plurality of game starts, a wager amount from the player;

awarding, by the wagering game device and to the player, one or more representations of seeds throughout the plurality of game starts of the primary wagering game;

receiving, by the wagering game device and after an awarding of at least one of the one or more representations of seeds, an election from the player to plant the at least one of the one or more representations of seeds to initiate a secondary non-wagering game at the wagering game device;

displaying, by the wagering game device and after the receiving of the election from the player, one or more plants growing from planted seeds;

displaying, by the wagering game device and after the receiving of the election from the player, a representation of at least one crop associated with a growing plant;

determining, by the wagering game device and based on one or more results from the plurality of game starts of the primary wagering game, a value of a bonus payout for the secondary non-wagering game; and ending, by the wagering game device, the secondary non-wagering game by depicting a harvesting of the at least one crop and a selling of the at least one crop resulting in sale proceeds equal to the value of the bonus payout and providing the bonus payout to the player by adding the value of the bonus payout to a credit meter of the primary wagering game.

10. The method of claim 9, further comprising:

providing supplementary elements to the player in the primary wagering game for use in the secondary non-wagering game.

11. The method of claim 10, wherein the supplementary elements comprise one or more of a representation of sunlight and a representation of water.

12. The method of claim 9, wherein the representation of the at least one crop changes throughout the plurality of game starts of the primary wagering game.

13. The method of claim 12, wherein the determining of the value of the bonus payout is based on only a first one of the one or more results from the plurality of game starts of the primary wagering game.

14. The method of claim 9 further comprising displaying a representation of a seed that fails to germinate.

15. The method of claim 9 further comprising displaying a representation of a plant growing and producing food incapable of being harvested.

16. A method, comprising:

receiving a wager amount from a player of a gaming device;

causing at least one display device to display to the player that the player is entitled to a bonus payout, in which the bonus payout is in addition to any primary game payouts;

thereafter, causing the at least one display device to display a plurality of spins of a plurality of reels of the gaming device, wherein the plurality of spins occur within a single session played by the player, and each spin of the plurality of spins results in a display of at least one primary game symbol of a plurality of different primary game symbols;

after a spin of the plurality of spins, causing at least one processor to execute a plurality of instructions to determine a numerical value of the bonus payout based on any displayed designated symbols, in which the numerical value of the bonus payout is greater than zero, and wherein the numerical value of the bonus payout does not change after the numerical value of the bonus payout is determined;

after each spin of the plurality of spins, causing the at least one display device to display a representation of the determined numerical value of the bonus payout without indicating to the player the determined numerical value of the bonus payout, and for each of a plurality of displayed symbols, if a designated symbol is displayed, said designated symbol causes a change in the representation of the determined numerical value of the bonus payout without indicating to the player the determined numerical value of the bonus payout;

after all of the spins of the plurality of spins, causing the at least one display device to display the determined numerical value of the bonus payout; and after all of the spins of the plurality of spins, causing the determined numerical value of the bonus payout to be provided.

* * * * *